(12) United States Patent
Tamekuni et al.

(10) Patent No.: US 6,196,732 B1
(45) Date of Patent: Mar. 6, 2001

(54) OPTICAL CONNECTOR, METHOD OF MAKING THE SAME, AND FERRULE FOR OPTICAL CONNECTOR

(75) Inventors: Yoshikyo Tamekuni; Kenichiro Ohtsuka; Tomohiko Ueda; Toshiaki Kakii, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/364,032

(22) Filed: Jul. 30, 1999

(30) Foreign Application Priority Data

Jul. 31, 1998 (JP) .................................................. 10-218007
Jul. 31, 1998 (JP) .................................................. 10-218014

(51) Int. Cl.⁷ ................................ G02B 6/00; G02B 6/36
(52) U.S. Cl. ............................................................ 385/78
(58) Field of Search ............................ 385/75–79, 85–89, 385/147

(56) References Cited

U.S. PATENT DOCUMENTS 5,363,459 * 11/1994 Hultermans ............................. 385/60
5,770,001 * 6/1998 Nagayama et al. ................... 156/350
5,960,138 * 9/1999 Shimoji et al. ......................... 385/78
6,007,257 * 12/1999 Ogawa et al. .......................... 385/80
6,095,695 * 8/2000 Ohtsuka et al. ........................ 385/72

FOREIGN PATENT DOCUMENTS 6-222247   8/1994   (JP) .
6-258552   9/1994   (JP) .

* cited by examiner

Primary Examiner—Akm E. Ullah
(74) Attorney, Agent, or Firm—McDermott, Will & Emery

(57) ABSTRACT

The ferrule 7 of the optical connector in accordance with the present invention has an optical fiber inserting portion 11 extending inward from an optical connection opening 10 formed in the nose surface 9, thereby projecting the end portion of an optical fiber 8 from the optical connection opening 10 in the nose surface 9. The nose surface 9 has a first flat portion 15 and a second flat portion 14. The second flat portion 14 extends while including the optical connection opening 10 therein. The first flat portion 15 extends so as to project ahead of the second flat portion 14. The end surface of the optical fiber 8 is disposed within the same plane as the first flat portion

12 Claims, 15 Drawing Sheets

OPTICAL CONNECTOR, METHOD OF MAKING THE SAME, AND FERRULE FOR OPTICAL CONNECTOR

BACKGROUND OF THE INVENTION

1. Field of the Invention

The present invention relates to an optical connector for establishing an optical connection by bringing the end surfaces of optical fibers into contact with each other, a method of making the same, and a ferrule for this optical connector.

2. Related Background Art

Conventionally known as a technique in this field is one disclosed in Japanese Patent Application Laid-Open No. 6-258552. The optical connector disclosed in this publication has a protruded portion at the center of the nose of its ferrule, and the fiber positioning hole for securing an optical fiber is formed so as to have an opening at the protruded portion. As a consequence, the protruded portion enables ferrules to come into close contact with each other, thereby realizing a stable PC (Physical Contact) connection with low optical loss.

Similarly, Japanese Patent Application Laid-Open No. 6-222247 discloses an optical connector capable of PC connections. In the method of making this optical connector, a spacer with thickness equal to the protruded length of the optical fiber is used. A pin of the spacer is initially inserted into a guide pin hole of the ferrule, and then the part of optical fiber projected from the nose surface of the spacer is ground until the grinder surface reaches the spacer. As a result, the end portion of the optical fiber can be projected from the nose surface of the ferrule in conformity with the thickness of the spacer.

SUMMARY OF THE INVENTION

Since the conventional connectors are configured as mentioned above, there have been problems as follows. Namely, when the end portion of the optical fiber is projected from the nose surface of the ferrule by a predetermined amount, extreme care should be taken so as not to grind the nose surface of the ferrule at the time of grinding the end surface of the optical fiber, and high-precision grinding control is necessary so as not to grind the end surface of the optical fiber in excess.

In view of such problems, it is an object of the present invention to provide an optical connector securing an optical fiber projecting therefrom by a predetermined amount, which is easy to make; a method of making the same; and an optical connector ferrule used in this optical connector.

In order to overcome the above-mentioned problems, the optical connector in accordance with the present invention is an optical connector in which at least one optical fiber is provided within a ferrule such that an end portion of the optical fiber projects from a nose surface of the ferrule; wherein the nose surface of the ferrule comprises a first portion and a second portion, the first portion having a flat surface at the front extremity of the ferrule and the second portion being shaped such that the optically connecting end portion of the optical fiber is protruded from the second portion to the extent of a hypothetical plane extended from the first portion.

In the optical connector ferrule in accordance with the present invention, on the other hand, the ferrule has an optical fiber positioning hole for receiving and securing an optical fiber, the nose surface of the ferrule has a first flat portion, the nose surface excluding the first flat portion is positioned nearer the ferrule than is a plane including the first flat portion, an opening of the optical fiber positioning hole on the nose surface is positioned excluding the first flat portion.

The method of making an optical connector in accordance with the present invention comprises: a step of inserting the fiber into said ferrule, the ferrule having a nose surface comprising a first flat portion at the front extremity of the ferrule, and the remaining portion excluding the first portion, such that the end portion of the fiber is projected from the nose surface of the ferrule beyond a hypothetical plane extended from the first portion; and a step of grinding an end face of the fiber while using the first portion as a reference surface until the surface of the first flat portion and the end surface of the fiber are flush with each other, such that the end portion of the fiber projects from the remaining portion by a predetermined length, so as to form an end surface.

Since the optical connector in accordance with the present invention is configured as mentioned above, connectors can tightly be connected together by use of the first flat portion, thus allowing a stable PC connection with low optical loss to be realized. Also, this optical connector can easily be made by the manufacturing method in accordance with the present invention mentioned above using the optical connector ferrule in accordance with the present invention. Namely, when securing the optical fiber to the ferrule, as the end surface of the optical fiber is ground, while being projected ahead of the first flat portion, with the front face of the first flat portion being used as a reference surface, i.e., as the grinder surface of a grinding jig is set parallel to the first flat portion and grinds the end surface of the optical fiber, the spacer conventionally needed at the time of grinding becomes unnecessary. Further, until the grinder surface reaches the first flat portion, the grinding force is small since the optical fiber is ground alone, whereby the grinding speed can be made sufficiently high. After the grinder surface has reached the first flat portion, by contrast, the first flat portion is ground together, whereby the grinding area suddenly enlarges, which drastically decreases the grinding speed of the optical fiber. As a result, in an optical connector which requires the amount of projection of the optical fiber to be controlled on the order of microns, a greater margin in terms of time is obtained at the moment when stopping the grinding operation, whereby the control becomes easier. Also, the position of the end surface of the optical fiber can always be made flush with the first flat portion. Therefore, it is preferred that the first flat portion be ground together with the end surface of the optical fiber in the final stage of the grinding step.

The second portion may has a flat surface parallel to the flat surface of the first portion. As a consequence, the amount of projection of the optical fiber can easily be controlled according to the distance between the flat surfaces of first and second portions.

The flat surface of the first portion may be formed so as to be perpendicular to an axis of the optical fiber, or tilted with respect to an axis of the optical fiber. When formed with a tilt, it is preferred that the angle which the normal line of the flat surface of the first portion forms with the axis of the optical fiber is 8 degrees. The second portion has a flat surface connected to the first flat portion at a predetermined angle. Alternatively, the second portion has a curved surface connected to the first flat portion.

In any of the above-mentioned configurations, a predetermined amount of an optical fiber can easily be projected at the time when making an optical connector, and a secure PC connection can be realized in thus made optical connector.

Preferably, the end surface of the optical fiber may have a substantially convex semi-spherical surface. This convex surface is achieved by buffing the end surface of the optical fiber. According to this convex surface, it is easy to achieve secure PC connection.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 is a partial perspective view of a ferrule portion of the optical connector shown in FIG. 1, whereas

DETAILED DESCRIPTION OF THE PREFERRED EMBODIMENTS

Figure 1:
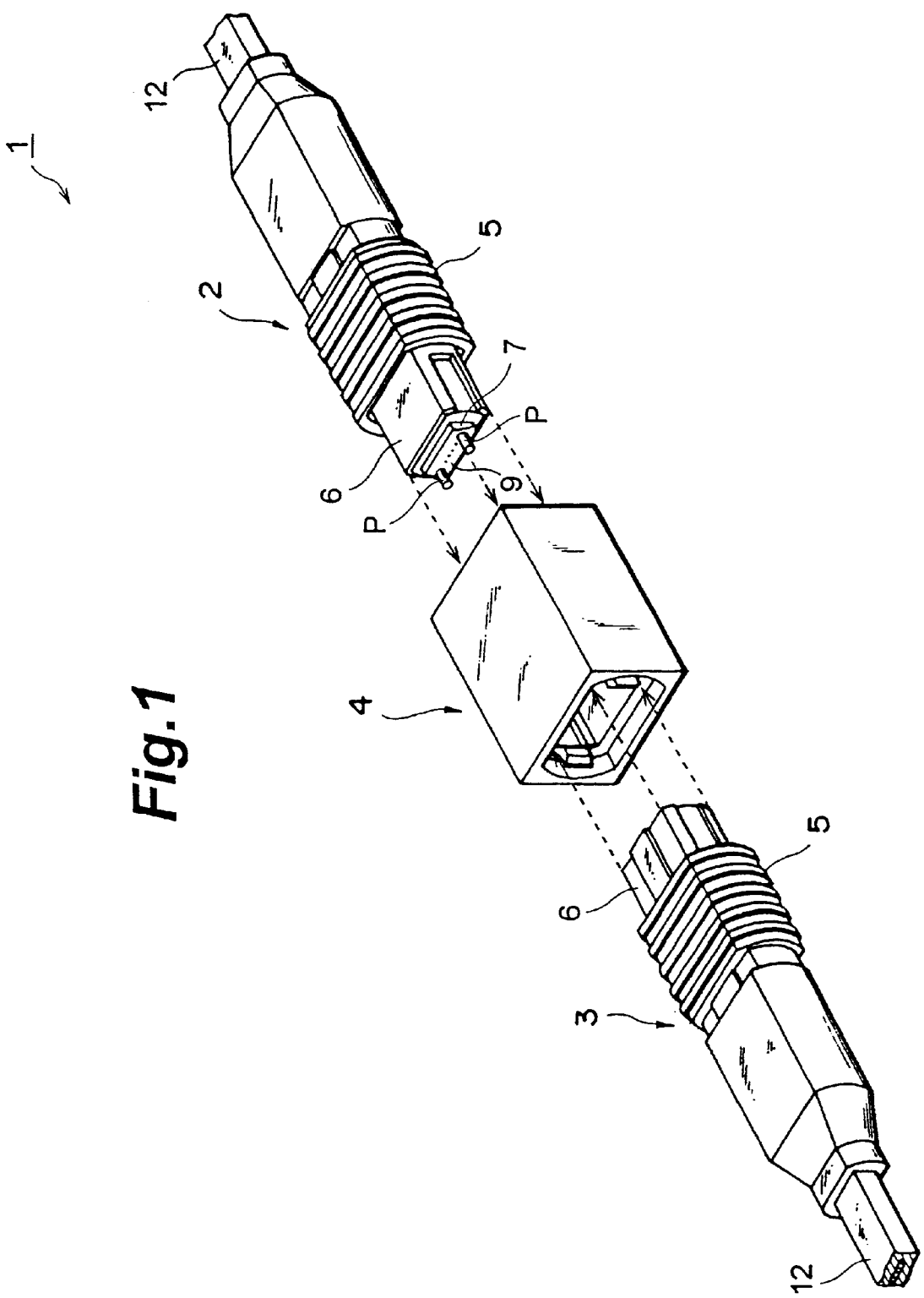
FIG. 1 is a perspective view showing an embodiment of the optical connector in accordance with the present invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted. The dimensions in the drawing are partly exaggerated and do not always correspond to actual ratios of dimensions.

First Embodiment

FIG. 1 is a perspective view showing optical connectors in accordance with the present invention. Each of the optical connectors 2, 3 shown in this drawing is constituted as a plug for a push-on/pull-off type connector (e.g., MPO type connector) 1, and has a structure for realizing a PC connection between optical fibers, thereby enabling one-touch connection when simply being pushed into an adapter 4. Each optical connector 2, 3 can easily be removed from the adapter 4 when pulled out therefrom with an injector 5 of the optical connector 2, 3 being held with fingers. The optical connector 2 has a sleeve-shaped housing 6 made of a plastic, whereas a ferrule 7 is accommodated in the housing 6.

Figure 2:
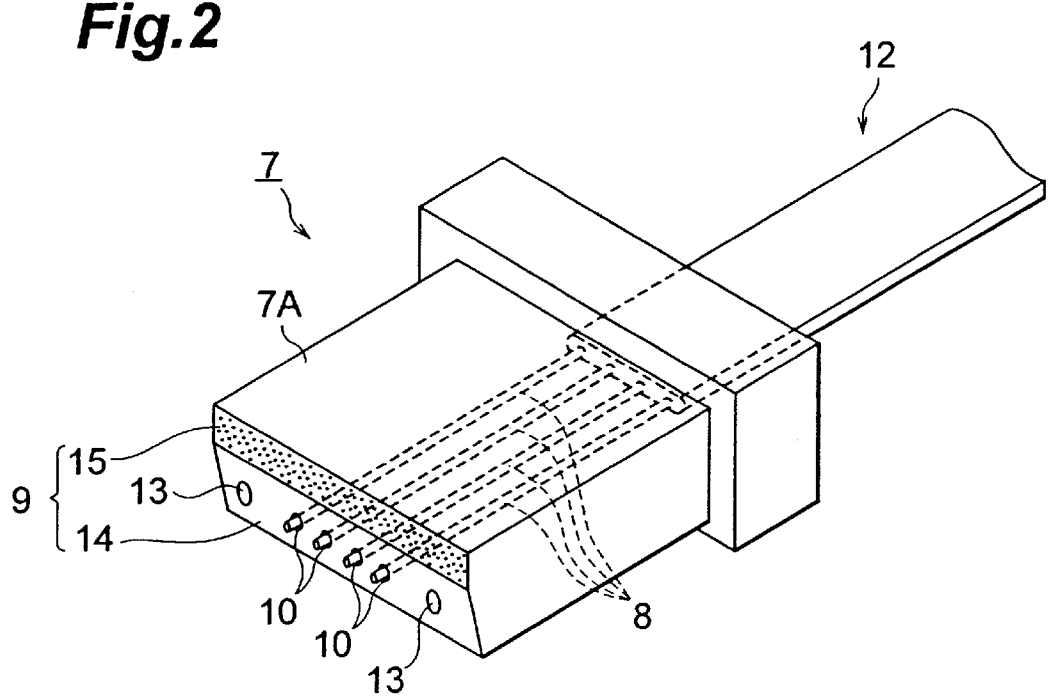
Figure 3:
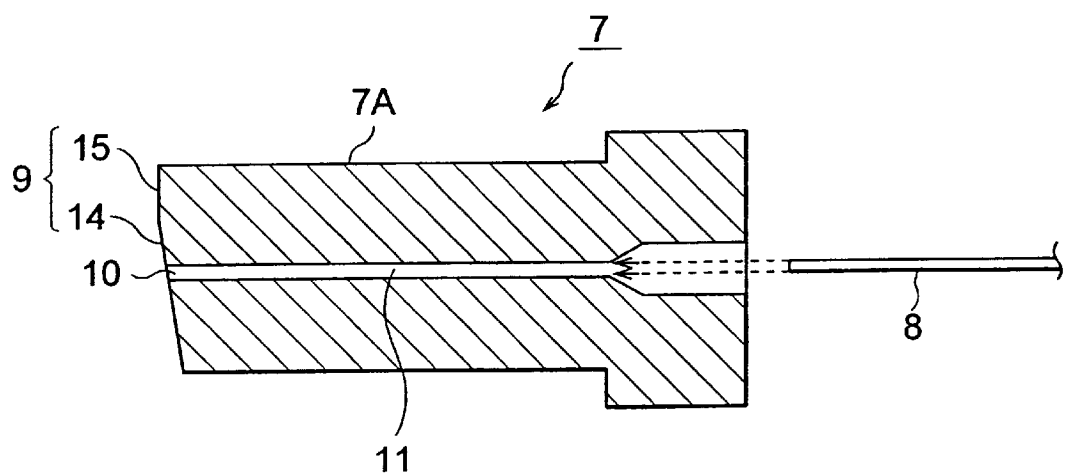
FIG. 3 is a sectional view of the ferrule.

As shown in FIG. 2, the ferrule 7 is formed from an epoxy resin filled with fine particles of glass (glass filler), in order to make its coefficient of thermal expansion approach that of optical fibers 8 within a coated optical fiber 12. As shown in FIG. 3, the ferrule 7 is provided with hole-like optical fiber inserting portions 11 extending inward from their corresponding four optical connection openings 10 formed in the nose surface 9. Inserted into the respective fiber inserting portions 11 are four optical fibers 8 exposed from the end portion of the coated optical fiber 12 by removing the coating, each optical fiber 8 being secured within the respective optical fiber inserting portion 11 by means of an adhesive. The end portion of each fiber 8 projects from the nose surface 9 of the ferrule 7 by a predetermined length, thereby enabling a PC connection. The ferrule 7 is provided with guide pin holes 13, located on both end sides of the row of optical connection openings 10, for receiving their respective guide pins P (see FIG. 1).

Figure 4:
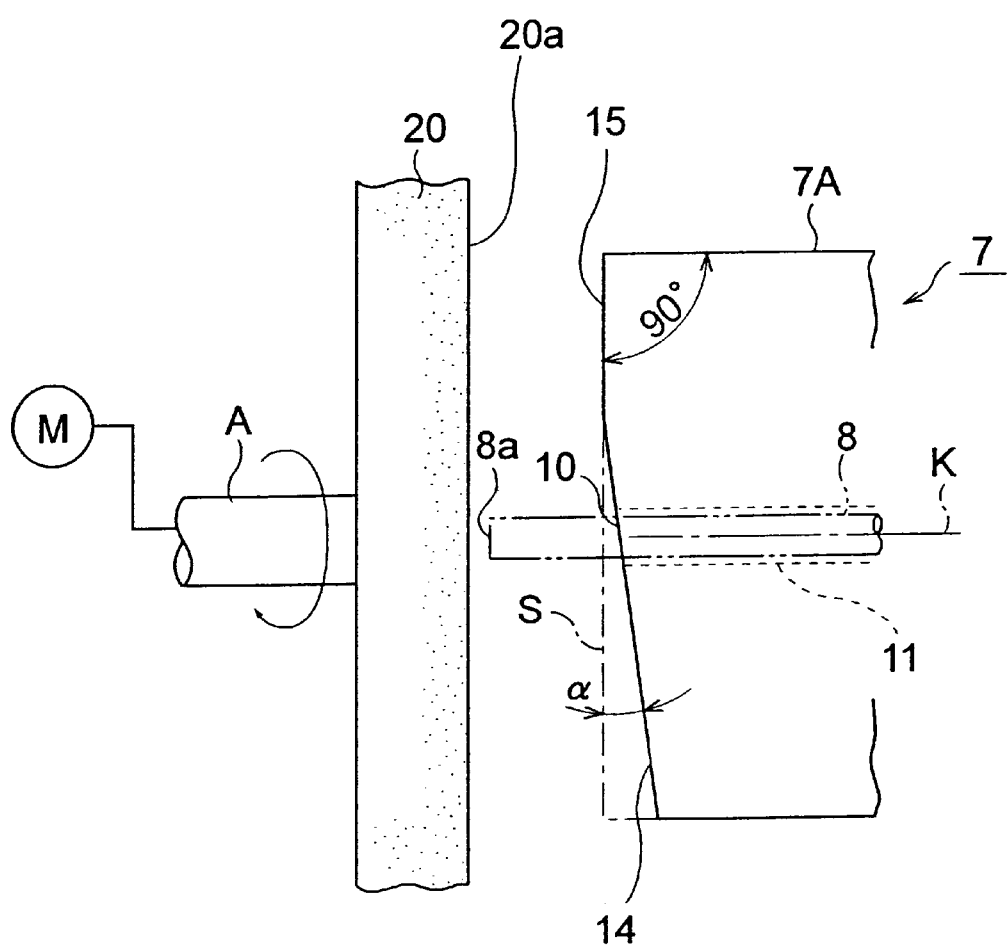
FIG. 4 is an enlarged side view showing the vicinity of the nose surface of the optical connector shown in FIG. 1 together with a grinding apparatus.

Here, as shown in FIG. 4, the nose surface 9 of the ferrule 7 is constituted by a first flat portion 15 and a second flat portion 14. The first flat portion 15 is formed with an angle of 90 degrees with respect to a flat upper face 7A of the ferrule 7 which extends parallel to the axis K of the optical fiber inserting portions 11, and is utilized as the reference surface for grinding as will be explained later. On the other hand, the second flat portion 14 is recessed than the first flat portion 15, whereas the optical connection openings 10 open into the second flat portion 14. Namely, the second flat portion 14 is tilted by an angle of α (e.g., 1 to 2 degrees) with respect to the first flat portion 15 while being connected to the first flat portion 15.

The method of making this connector, i.e., the method of making an optical connector in accordance with the present invention, will now be explained specifically. First, the coated optical fiber 12 is stripped of the coating, so as to expose four optical fibers 8. Then, as shown in FIG. 3, the optical fibers 8 are inserted into their corresponding optical fiber inserting portions 11 of the ferrule 7 from therebehind, and are secured, by means of an adhesive, into the respective optical fiber inserting portions 11 or to the respective optical connecting openings 10. At this time, the end portion of each optical fiber 8 is projected from the nose surface 9 of the ferrule 7 by a predetermined length or more. Specifically, all the end portions of the optical fibers 8 are arranged so as to project from a hypothetical reference plane S which is flush with the first flat portion 15.

Figure 5:
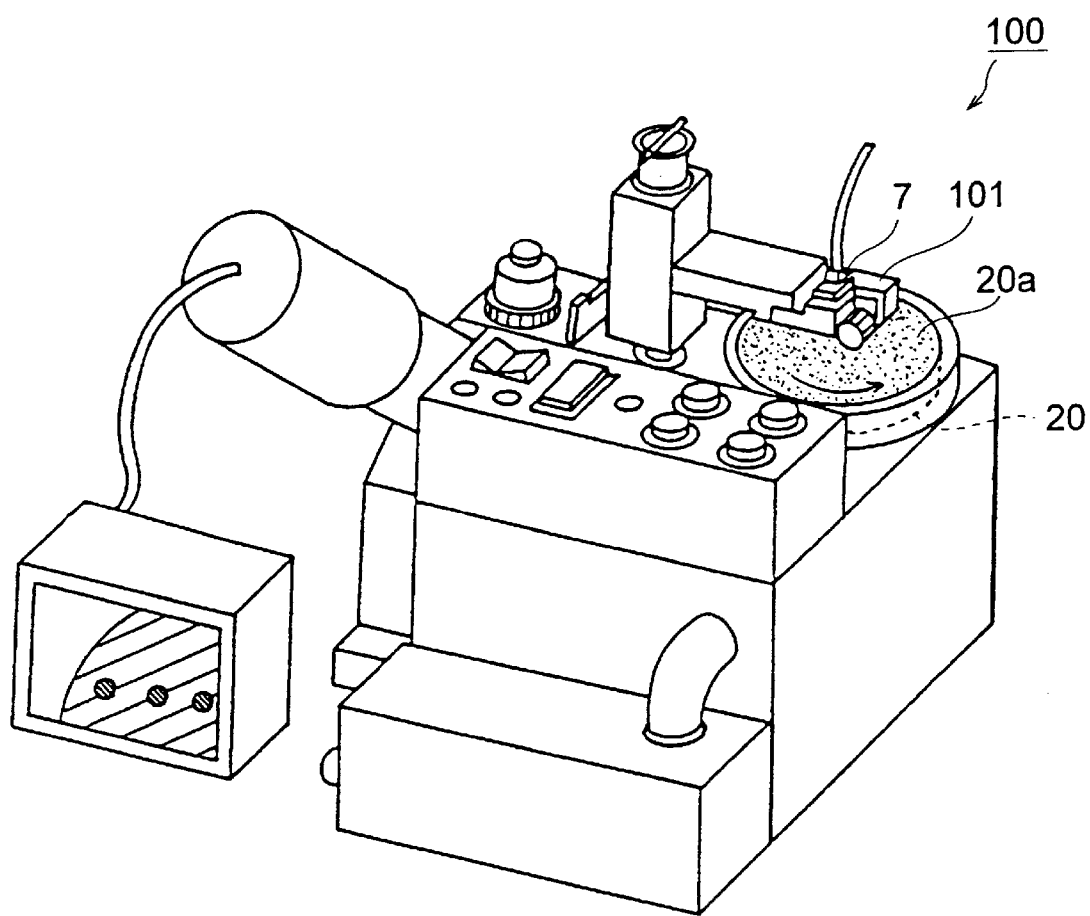
FIG. 5 is a perspective view showing a grinding jig used in the method of making an optical connector in accordance with the present invention.

In the state where the optical fibers 8 are thus mounted in the ferrule 7, the ferrule 7 is set at the ferrule chuck portion 101 of a grinding jig 100 shown in FIG. 5. At this time, as shown in FIG. 4, the relative positional relationship between the grinder surface 20a of the grinder 20 secured to the rotary axis A of a motor M and the nose surface 9 of the ferrule 7 is set, with reference to the first flat portion 15, such that the grinder surface 20a and the first flat portion 15 are parallel to each other. This grinding jig 100 is identical to that disclosed in Japanese Patent Application Laid-Open No. 7-251363, which is merely an example of grinding jigs as a matter of course.

Figure 6:
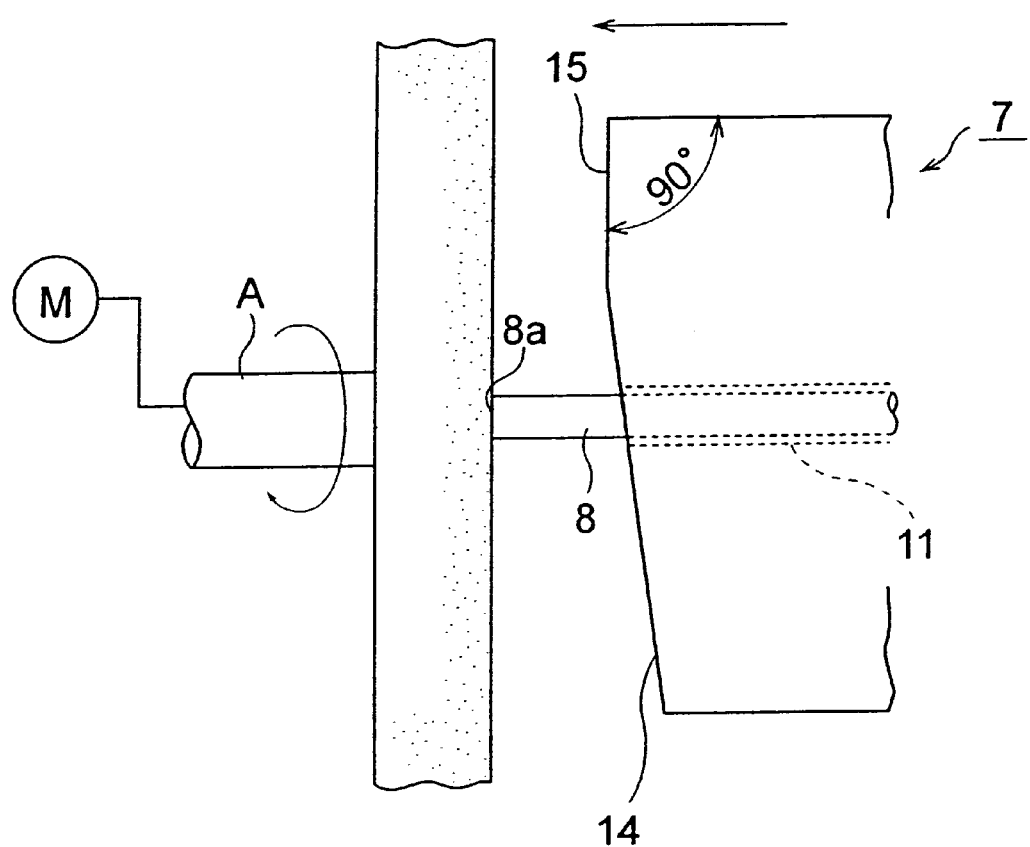
FIG. 6 is an enlarged main partial side view showing the state of an optical fiber being ground at the time of making the optical connector shown in FIG. 1.
Figure 7:
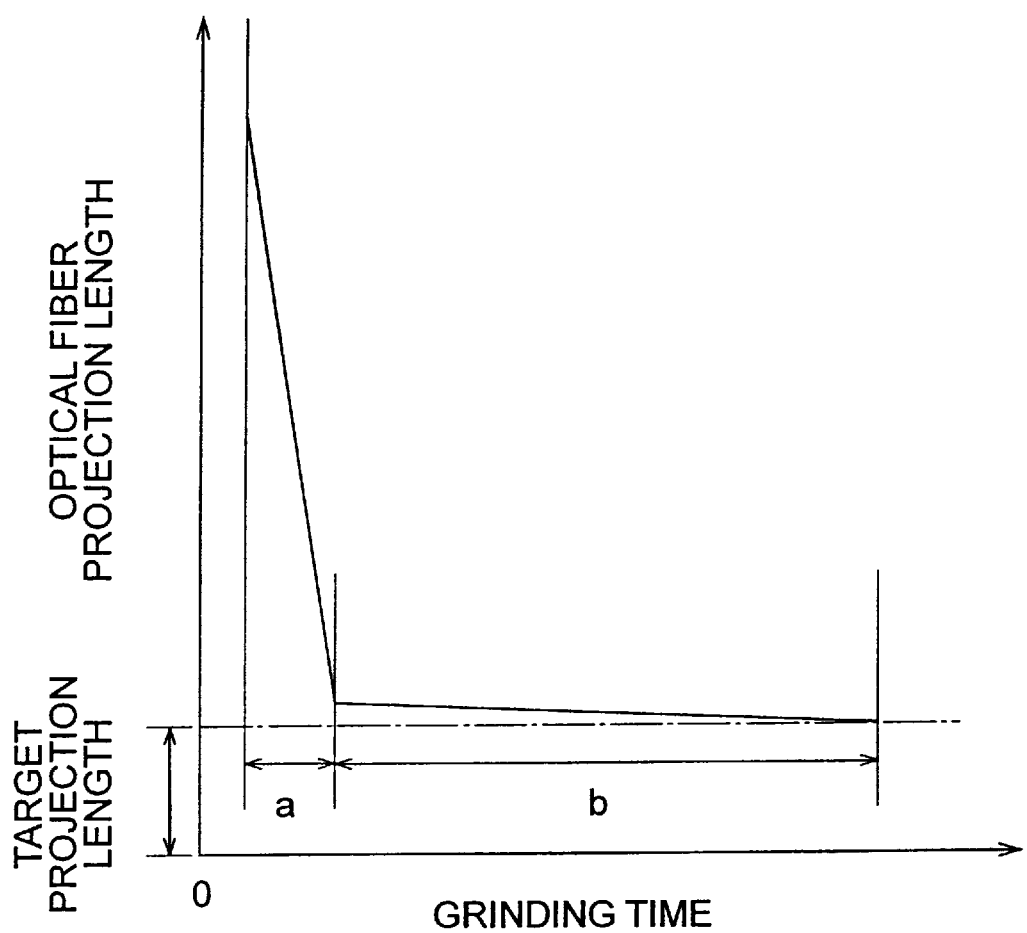
FIG. 7 is a chart showing the relationship between the projection length and grinding time in the method of making an optical connector in accordance with the present invention.

Thereafter, as shown in FIG. 6, the motor M is caused to start revolutions about the rotary axis A, and the ferrule 7 is moved so as to approach the grinder surface 20a, whereby the end surface 8a of each optical fiber 8 is ground with the grinder surface 20a. At the initial stage of grinding, the grinder surface 20a comes into contact with and grinds only the end surface 8a of the optical fiber 8. FIG. 7 is a graph showing the change in the length of projection of an optical fiber 8 from its corresponding opening 10 in the grinding step. During the initial stage, the grinding speed, which corresponds to the length of the optical fiber 8 ground per unit time, is high as shown in region a in FIG. 7.

Figure 8:
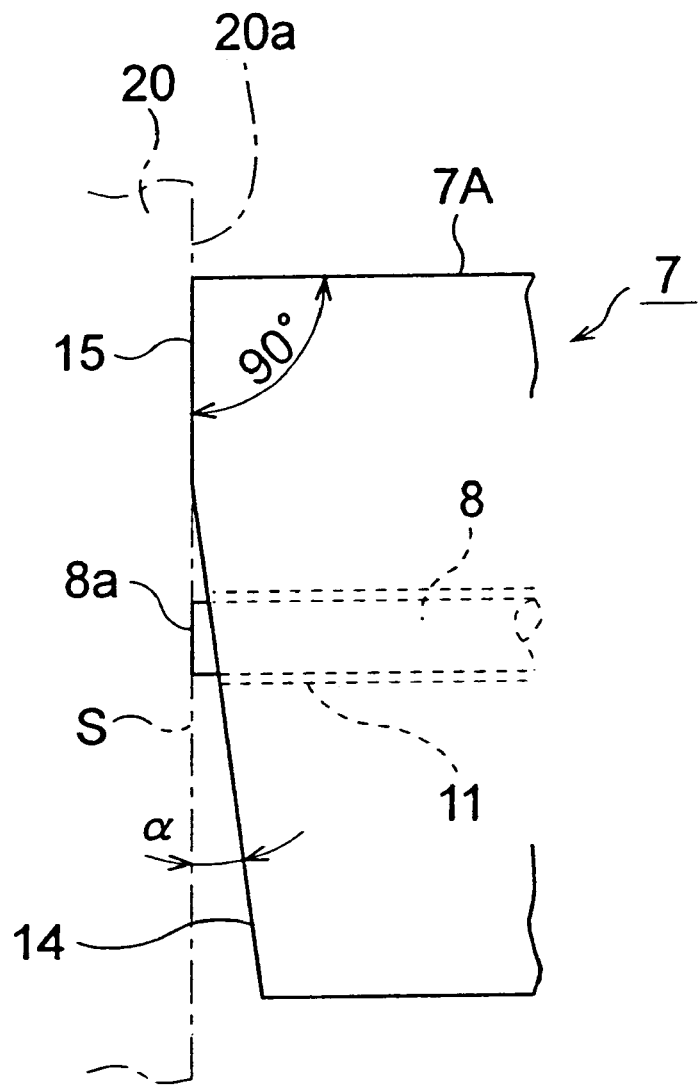
FIG. 8 is an enlarged main partial side view showing the state of the optical connector shown in FIG. 1 after being made.

Thereafter, at the same time when the grinder surface 20a reaches the first flat portion 15 as shown in FIG. 8, the grinding area drastically enlarges. As a result, as indicated by region b in FIG. 7, the grinding speed of the optical fiber 8 would drop suddenly. Therefore, as compared with the case where the optical fiber 8 is ground alone so as to control the amount of its projection, a greater margin in terms of time is obtained when stopping the grinding for securing a desirable amount of projection, whereby it becomes quite easier to control the grinding, thus enabling the amount of projection of the optical fiber 8 to be controlled with a high accuracy on the order of microns.

Then, when the grinding operation is stopped in the state where the grinder surface 20a is grinding the first flat portion 15, the end surface 8a of the optical fiber 8 can be formed so as to attain a state in which it is positioned within the hypothetical reference plane S without projecting ahead of the first flat portion 15 and projects from the second flat portion 14 by a predetermined amount (e.g., about 0.02 mm). Thus, the first flat portion 15 is utilized as a reference surface for determining the amount of projection of the optical fiber 8, whereby the amount of projection of the optical fiber 8 can favorably be controlled.

Figure 9:
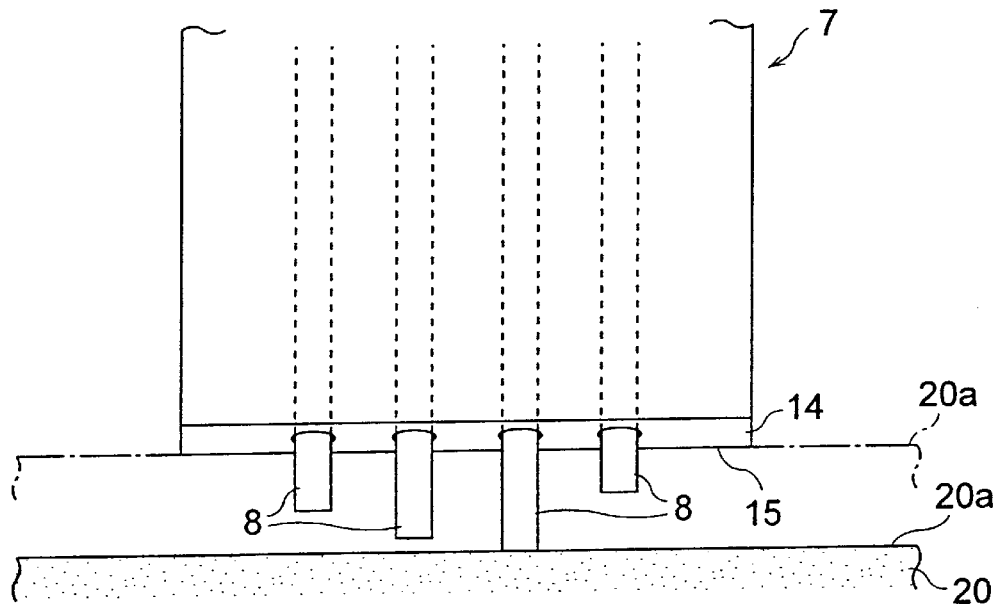
FIG. 9 is a view showing the state where the end portions of individual optical fibers projecting from the ferrule do not align with each other before grinding the optical fibers in the method of making an optical connector in accordance with the present invention.

Also, if the initial amount of projection fluctuates among the individual optical fibers 8 as shown in FIG. 9 at the time when they are mounted, the respective end surfaces of the optical fibers 8 can accurately be disposed within the hypothetical reference plane S at last. As a consequence, it is only necessary, at the time of mounting, to make sure that the end surface of each optical fiber 8 projects from the hypothetical reference plane S, whereby the operation of the mounting step before the grinding step becomes easier.

The amount of projection of the optical fiber 8 can be adjusted by changing the boundary position between the first flat portion 15 and the second flat portion 14 or by changing the magnitude of angle α. As the angle α is greater, the optical fiber 8 can be projected from the second flat portion 14 by a larger amount, as a matter of course.

Figure 10:
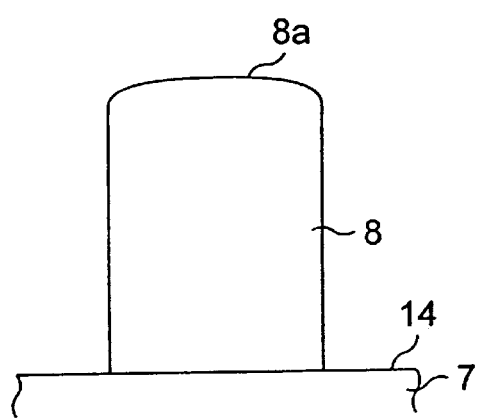
FIG. 10 is an enlarged front view showing the state of the end portion of an optical fiber projecting from the nose surface of the ferrule.

The end surface 8a of each optical fiber 8 forms a convex semi-spherical surface as shown in FIG. 10, so as to appropriately prevent the end portion edge of the optical fiber from chipping off. For example, when the end surface 8a of the optical fiber 8 is buffed with a velvet cloth having an alumina solvent with a grain size of 1 μm dropped thereon, then the end surface 8a yields a roundness and, at the same time, its edges are rounded off. By such a rounding operation, the process-degraded layer generated during the grinding of the end surface 8a of the optical fiber 8 can be eliminated. As the result of this operation, it is easy to achieve PC connection with low optical loss because the core portion of optical fiber protrudes from clad portion thereof. Experimentally, a reflection attenuation amount of 40 dB or greater has been confirmed.

Figure 11:
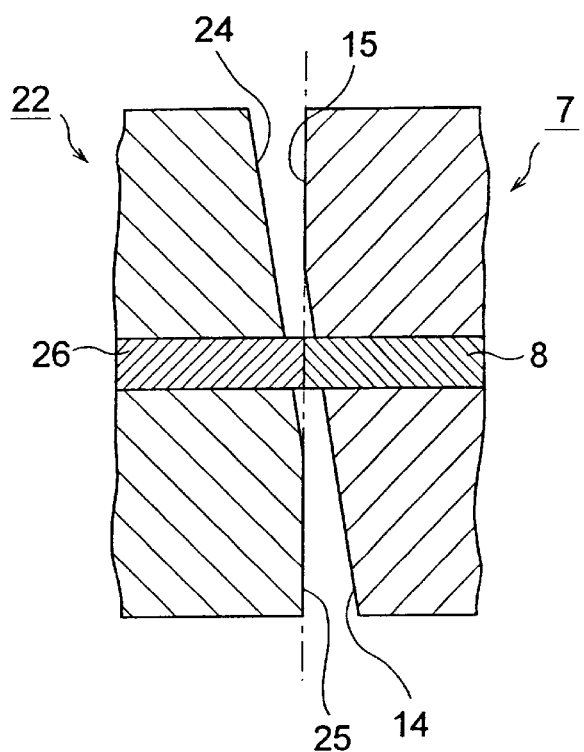
FIGS. 11 and 12 are views showing respective states of optical connections by use of the optical connector in accordance with the present invention.

FIG. 11 is a view showing a state of optical connection by use of the optical connector in accordance with the present invention. Depicted here is an example in which, with respect to the above-mentioned ferrule 7 for PC connection, a ferrule 22 having a form identical thereto is used in a connector to connect therewith. Namely, the nose surface 23 of the ferrule 22 has a first flat portion 25 and a second flat portion 24, whereas the end portion of each optical fiber 26 projects from the second flat portion 24. For establishing a PC connection between the optical fiber 8 and the optical fiber 26, the first flat portion 15 of the ferrule 7 and the second flat portion 24 of the ferrule 22 are opposed to each other, while the nose surface 9 of the ferrule 7 and the nose surface 23 of the ferrule 22 are kept from coming into contact with each other. Such a PC connection is utilized in MT connectors, MPO connectors, and the like.

Figure 12:
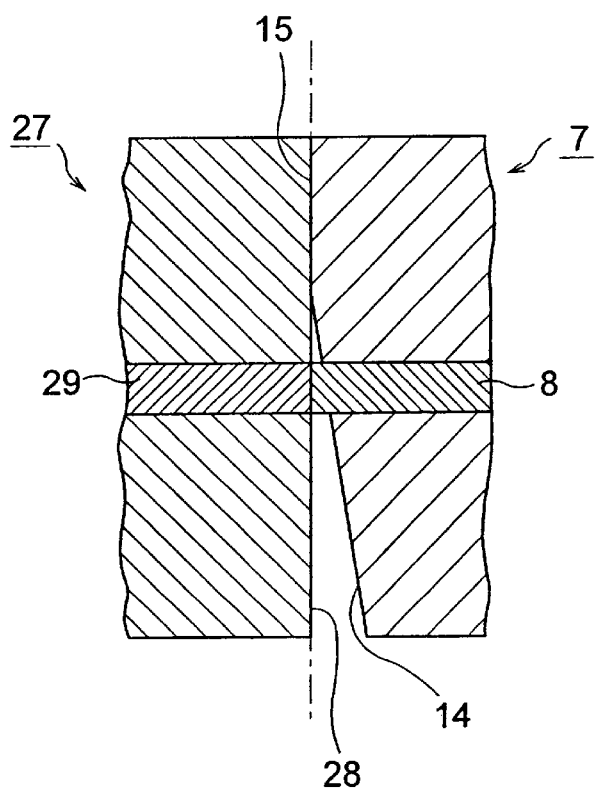

FIG. 12 is a view showing another state of optical connection. Depicted here is an example in which, with respect to the above-mentioned ferrule 7 for PC connection, a ferrule 27 having a form different therefrom is used in a connector to connect therewith. Namely, the nose surface 28 of the ferrule 27 is formed as a flat surface having neither steps nor inclinations, whereas the end surface of the optical fiber 29 is flush with the nose surface 28 of the ferrule 27. For establishing a PC connection between the optical fiber 8 and the optical fiber 29, the nose surface 28 of the ferrule 27 is caused to abut against the first flat portion 15 of the ferrule 7. As in the case of FIG. 11, such a PC connection is utilized in MT connectors, MPO connectors, and the like.

Other embodiments of the optical connector in accordance with the present invention will be explained in the following. The basic configuration of the optical connectors in accordance with the following embodiments is identical to that of the optical connector shown in FIG. 1, except for the structure of the nose surface portion of the ferrule.

Second Embodiment

Figure 13:
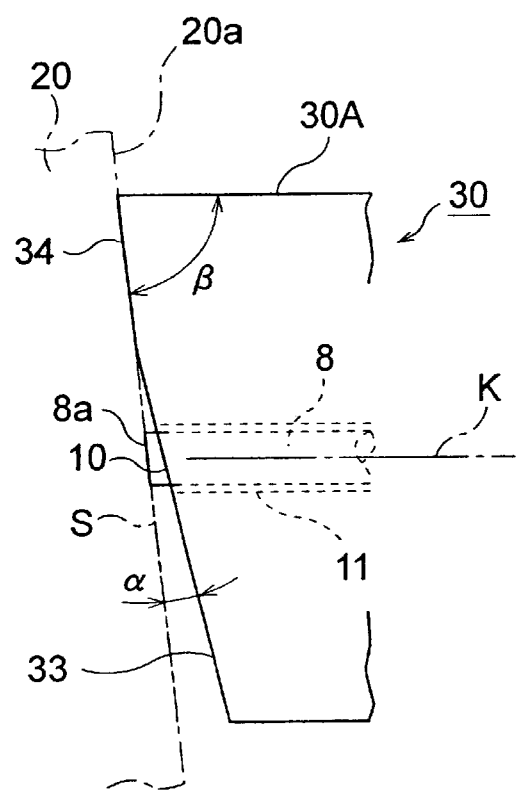
FIG. 13 is an enlarged main partial side view showing a second embodiment of the optical connector shown in FIG. 1.

FIG. 13 is an enlarged side view of the nose surface portion of the ferrule in a second embodiment of the optical connector in accordance with the present invention. As shown in FIG. 13, while the nose surface of the ferrule 30 has a first flat portion 34 and a second flat portion 33 as with the ferrule 7 shown in FIG. 4, it differs therefrom in that the plane S formed by the first flat portion 34 and the end surface 8a of the optical fiber 8 has an angle of inclination β at 82 degrees with respect to a flat upper face 30A of the ferrule 30 which extends parallel to the axis K of the optical fiber inserting portions 11. The angle β is set to 82 degrees, in view of the reflected returning light at the end surface 8a of the optical fiber 8, so as to form the end surface 8a of the optical fiber 8 as a surface tilted by 8 degrees.

In order for the plane S to be thus formed with an angle of inclination, it will be sufficient if a ferrule in which the upper face 30A and the first flat portion 34 form an angle of inclination β is used for mounting optical fibers 8, and then the end surface of each optical fiber 8 is ground while the grinder surface is set parallel to the first flat portion 34 as with the grinding step explained in the first embodiment. As a consequence, the grinder surface 20a can effect grinding while being tilted with respect to the axis K of the optical fiber 8 by a predetermined angle β.

Figure 14:
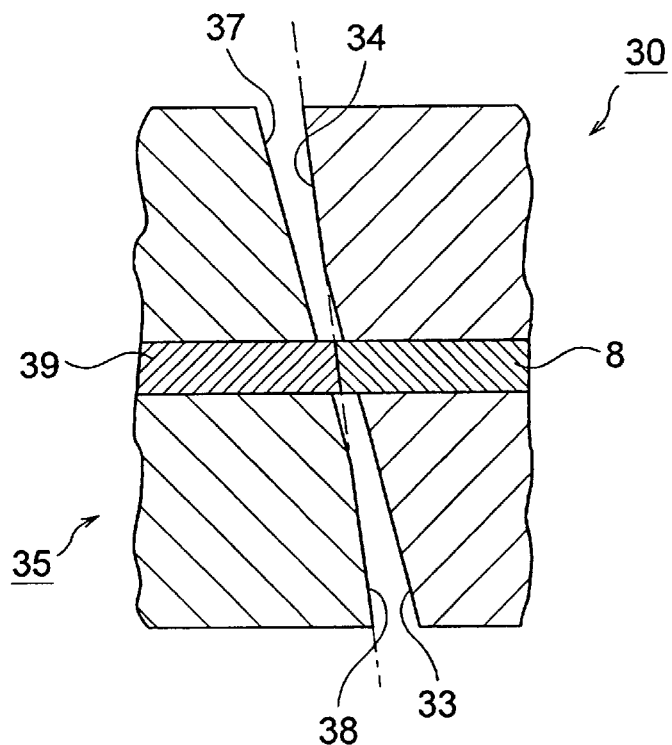
FIGS. 14 and 15 are views showing respective states of optical connections by use of the optical connector shown in FIG. 13.

FIG. 14 is a view showing a state of optical connection by use of the optical connector in accordance with the present invention. Depicted here is an example in which, with respect to the above-mentioned ferrule 30 for PC connection, a ferrule 35 having a form identical thereto is used in a connector to connect therewith. Namely, the nose surface of the ferrule 35 has a first flat portion 38 and a second flat portion 37, whereas the end portion of each optical fiber 39 projects from the second flat portion 37. For establishing a PC connection between the optical fiber 8 and the optical fiber 39, the first flat portion 34 of the ferrule 30 and the second flat portion 37 of the ferrule 35 are opposed to each other, while the nose surface of the ferrule 30 and the nose surface of the ferrule 35 are kept from coming into contact with each other. Such a PC connection is utilized in MT connectors, MPO connectors, and the like.

Figure 15:
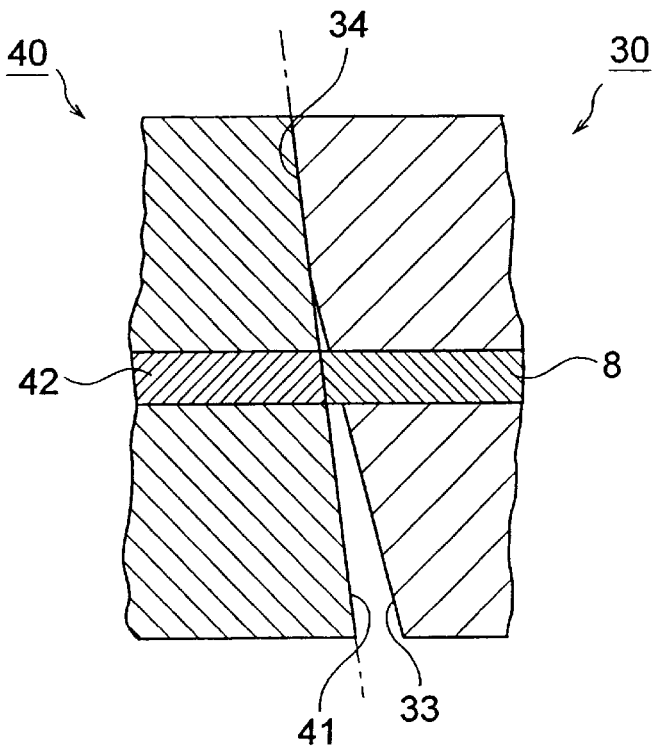

FIG. 15 is a view showing another state of optical connection. Depicted here is an example in which, with respect to the above-mentioned ferrule 30 for PC connection, a ferrule 40 having a form different therefrom is used in a connector to connect therewith. Namely, the nose surface 41 of the ferrule 40 is formed as a flat surface having no steps, with such an angle of inclination that it comes into surface contact with the first flat portion 34 of the ferrule 30. Also, the end surface of the optical fiber 42 is flush with the nose surface 41 of the ferrule 40. For establishing a PC connection between the optical fiber 8 and the optical fiber 42, the nose surface 41 of the ferrule 40 is caused to abut against the first flat portion 34 of the ferrule 30. As in the case of FIG. 14, such a PC connection is utilized in MT connectors, MPO connectors, and the like.

Third Embodiment

Figure 16:
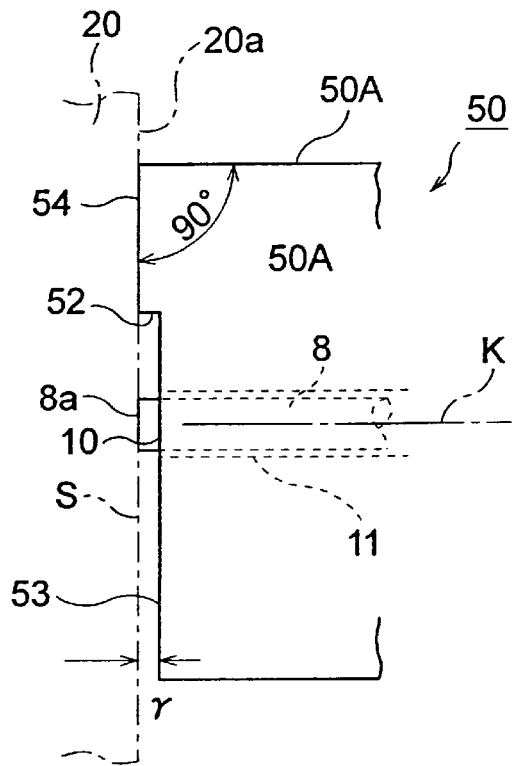
FIG. 16 is an enlarged main partial side view showing a third embodiment of the optical connector shown in FIG. 1.

FIG. 16 is an enlarged side view of the nose surface portion of the ferrule in a third embodiment of the optical connector in accordance with the present invention. As shown in FIG. 16, the nose surface of the ferrule 50 is formed with a first flat portion 54 and a second flat portion 53 which are parallel to each other and are connected together by a third flat portion 52.

Here, as with the ferrule 7 in the first embodiment shown in FIG. 4, the first flat portion 54 is formed so as to have an angle of 90 degrees with respect to a flat upper face 50A of the ferrule 50 extending parallel to the axis K of optical fiber inserting portions 11. Also, the second flat portion 53 including optical connection openings 10 through which the optical fiber inserting portions 11 penetrate is formed parallel to the first flat portion 54, while the distance therebetween is set to a predetermined amount γ, which is the amount of projection of the end surface 8a of each optical fiber 8.

Figure 17:
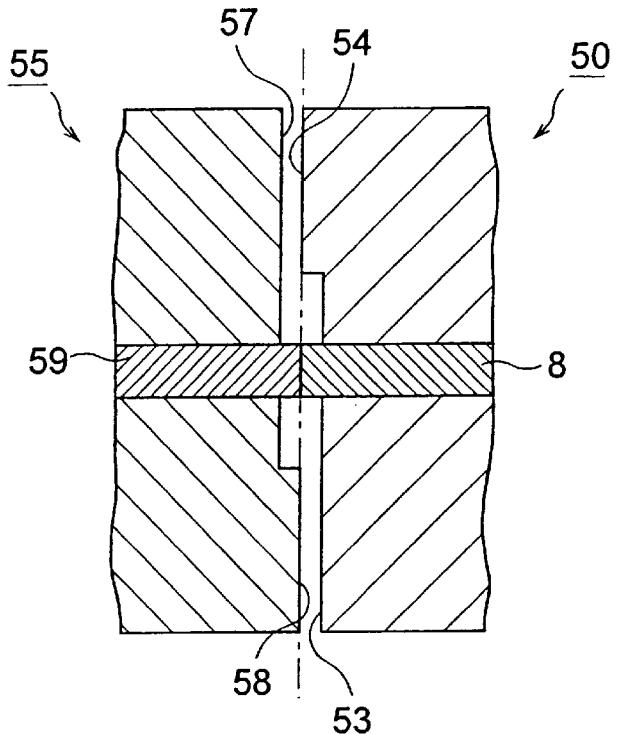
FIGS. 17 and 18 are views showing respective states of optical connections by use of the optical connector shown in FIG. 16.

FIG. 17 is a view showing a state of optical connection by use of the optical connector in accordance with the present invention. Depicted here is an example in which, with respect to the above-mentioned ferrule 50 for PC connection, a ferrule 55 having a form identical thereto is used in a connector to connect therewith. Namely, the nose surface of the ferrule 55 has a first flat portion 58 and a second flat portion 57, whereas the end portion of each optical fiber 59 projects from the second flat portion 57. For establishing a PC connection between the optical fiber 8 and the optical fiber 59, the first flat portion 54 of the ferrule 50 and the second flat portion 57 of the ferrule 55 are opposed to each other, while the nose surface of the ferrule 50 and the nose surface of the ferrule 55 are kept from coming into contact with each other. Such a PC connection is utilized in MT connectors, MPO connectors, and the like.

Figure 18:
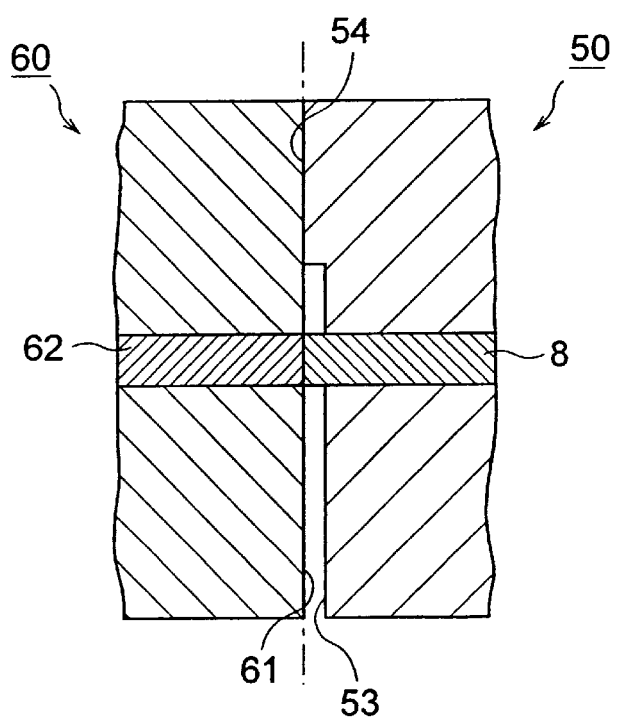

FIG. 18 is a view showing another state of optical connection. Depicted here is an example in which, with respect to the above-mentioned ferrule 50 for PC connection, a ferrule 60 having a form different therefrom is used in a connector to connect therewith. Namely, the nose surface 61 of the ferrule 60 is formed as a flat surface having neither steps nor inclinations, with such an angle of inclination that it comes into surface contact with the first flat portion 54 of the ferrule 50. Also, the end surface of the optical fiber 62 is flush with the nose surface 61 of the ferrule 60. For establishing a PC connection between the optical fiber 8 and the optical fiber 62, the nose surface 61 of the ferrule 60 is caused to abut against the first flat portion 54 of the ferrule 50. As in the case of FIG. 17, such a PC connection is utilized in MT connectors, MPO connectors, and the like.

Fourth Embodiment

Figure 19:
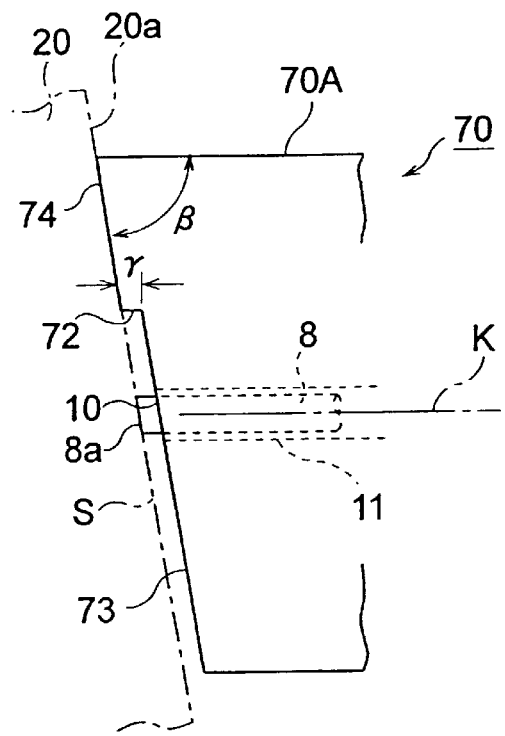
FIG. 19 is an enlarged main partial side view showing a fourth embodiment of the optical connector shown in FIG. 1.

FIG. 19 is an enlarged side view of the nose surface portion of the ferrule in a fourth embodiment of the optical connector in accordance with the present invention. The ferrule 70 shown in FIG. 19 is a modified mode of the ferrule 50 in the third embodiment shown in FIG. 16, from which it differs in that, as with the ferrule 30 in the second embodiment shown in FIG. 13, the first flat portion 74 is formed so as to have an angle of inclination β at 82 degrees with respect to a flat upper face 70A of the ferrule 70 which extends parallel to the axis K of optical fiber inserting portions 11.

Figure 20:
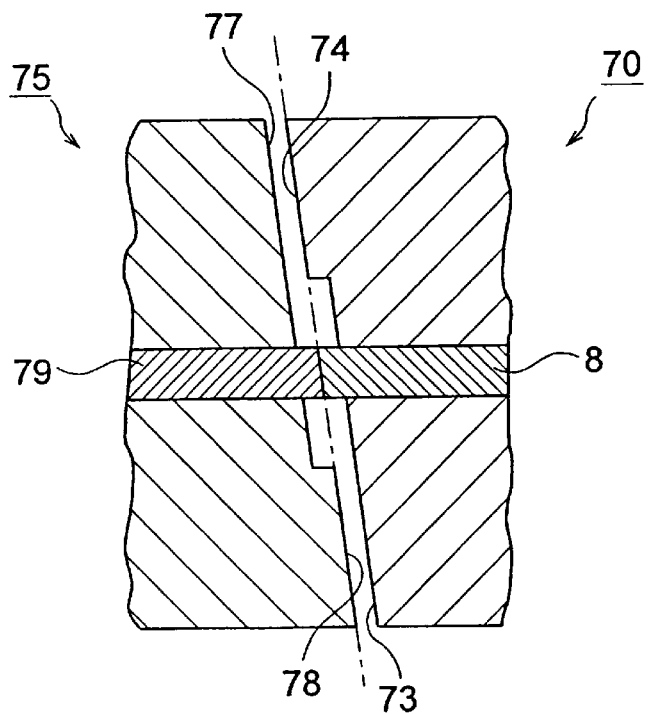
FIGS. 20 and 21 are views showing respective states of optical connections by use of the optical connector shown in FIG. 19.

FIG. 20 is a view showing a state of optical connection by use of the optical connector in accordance with the present invention. Depicted here is an example in which, with respect to the above-mentioned ferrule 70 for PC connection, a ferrule 75 having a form identical thereto is used in a connector to connect therewith. Namely, the nose surface of the ferrule 75 has a first flat portion 78 and a second flat portion 77, whereas the end portion of each optical fiber 79 projects from the second flat portion 77. For establishing a PC connection between the optical fiber 8 and the optical fiber 79, the first flat portion 74 of the ferrule 70 and the second flat portion 77 of the ferrule 75 are opposed to each other, while the nose surface of the ferrule 70 and the nose surface of the ferrule 75 are kept from coming into contact with each other. Such a PC connection is utilized in MT connectors, MPO connectors, and the like.

Figure 21:
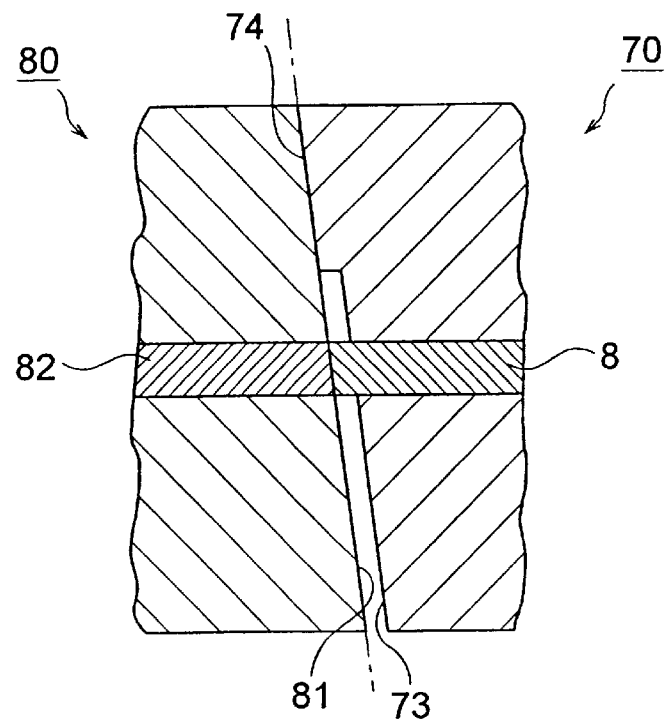

FIG. 21 is a view showing another state of optical connection. Depicted here is an example in which, with respect to the above-mentioned ferrule 70 for PC connection, a ferrule 80 having a form different there from is used in a connector to connect therewith. Namely, the nose surface 81 of the ferrule 80 is formed as a flat surface having no steps, with such an angle of inclination that it comes into surface contact with the first flat portion 74 of the ferrule 70. Also, the end surface of the optical fiber 82 is flush with the nose surface 81 of the ferrule 80. For establishing a PC connection between the optical fiber 8 and the optical fiber 82, the nose surface 81 of the ferrule 80 is caused to abut against the first flat portion 74 of the ferrule 70. As in the case of FIG. 20, such a PC connection is utilized in MT connectors, MPO connectors, and the like.

In each of the foregoing embodiments, as with the optical connector in accordance with the first embodiment, the amount of projection of optical fiber can be controlled with a high accuracy, and the control is easy. And the grinding process can be simplified by grinding only the optical fiber. Also, a secure PC connection can be effected.

Figure 22:
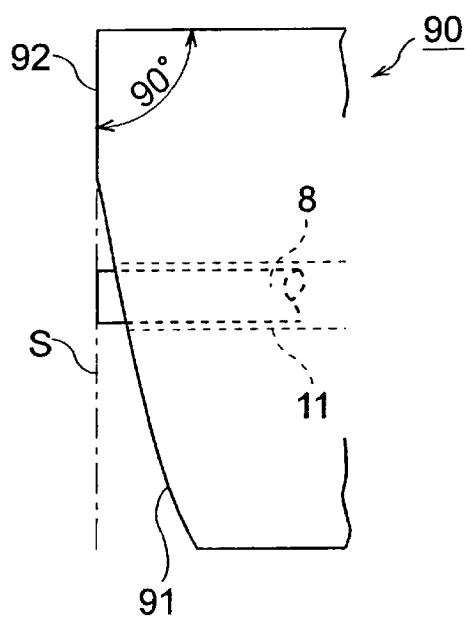
FIGS. 22 and 23 are enlarged main partial side views showing fifth and sixth embodiments of the optical connector shown in FIG. 1, respectively.
Figure 23:
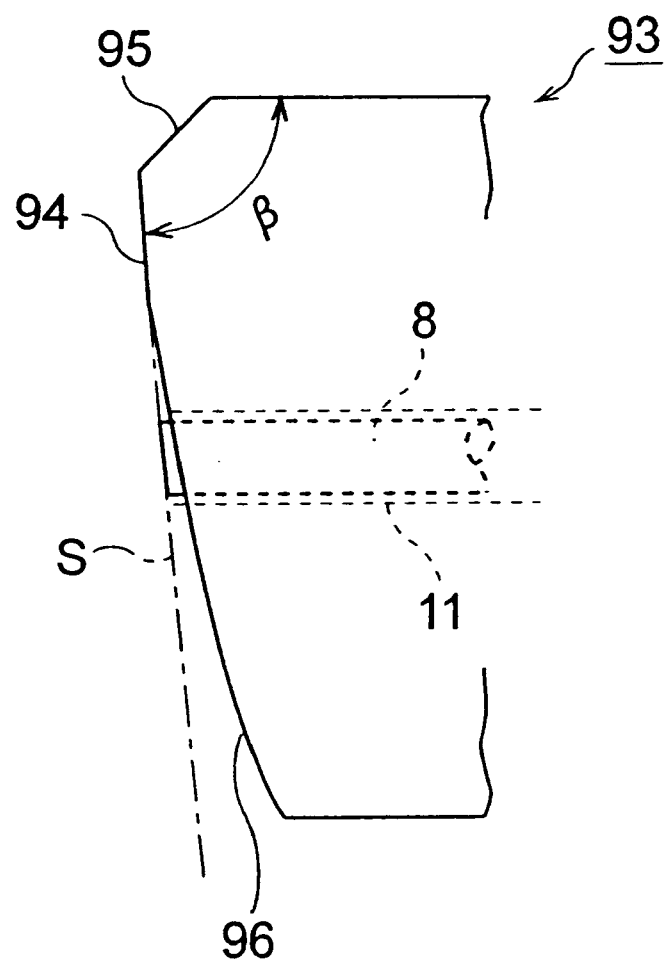

The ferrule in accordance with the present invention is not restricted to the above-mentioned embodiments. For example, in the ferrule 90 shown in FIG. 22, the first flat portion 92 may be formed by a flat surface, and a curved surface 91 connecting therewith may form a front end face. Also, as shown in FIG. 23, a chamfered portion 95 against chipping may be provided on the first flat portion 94 side of the ferrule 93. A chamfered portion (not shown) may be provided on the curved portion 96 side as well. The above-mentioned PC connection optical connector includes MT connectors, MPO connectors, and the like. The optical fibers 8 to be mounted to the optical connector are not limited to those having the number of cores mentioned above, and a single-core optical connector may be used as well.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical connector in which at least one optical fiber is provided within a ferrule such that an end portion of said optical fiber projects from a nose surface of said ferrule;
    wherein the nose surface of said ferrule comprises a first portion and a second portion, said first portion having a flat surface at the front extremity of said ferrule and said second portion being shaped such that the end portion of said optical fiber is protruded from said second portion to the extent of a hypothetical plane extended from said first portion.

2. An optical connector according to claim 1, wherein said second portion has a flat surface parallel to the flat surface of said first portion.

3. An optical connector according to claim 1, wherein the flat surface of said first portion is formed so as to be perpendicular to an axis of said optical fiber.

4. An optical connector according to claim 1, wherein the surface of said first flat portion is formed so as to be tilted with respect to an axis of said optical fiber.

5. An optical connector according to claim 4, wherein an angle which the normal line of the flat surface of said first portion forms with the axis of said optical fiber is 8 degrees.

6. An optical connector according to claim 1, wherein said second portion has a flat surface connected to said first portion at a predetermined angle.

7. An optical connector according to claim 1, wherein said second portion has a curved surface connected to said first portion.

8. An optical connector according to claim 1, wherein the end surface of said optical fiber has a substantially convex semi-spherical surface.

9. An optical connector ferrule used in an optical connector in which at least one optical fiber is provided within a ferrule such that an end portion of said optical fiber projects from a nose surface of said ferrule;
    wherein said ferrule has an optical fiber positioning hole for receiving and securing said optical fiber, the nose surface of said ferrule having a first flat portion at the front extremity of said ferrule, an opening of said optical fiber positioning hole on the nose surface being positioned excluding said first flat portion.

10. A method of making an optical connector having at least one optical fiber with an end portion thereof projecting from a nose surface of a ferrule, said method comprising:
    a step of inserting said fiber into said ferrule, said ferrule having a nose surface comprising a first flat portion at the front extremity of said ferrule, and the remaining portion excluding said first portion, such that the end portion of said optical fiber is projected from the nose surface of said ferrule beyond a hypothetical plane extended from said first portion; and
    a step of grinding an end surface of said fiber while using said first portion as a reference surface until the surface of said first flat portion and the end surface of said optical fiber are flush with each other, such that the end portion of said optical fiber projects from said remaining portion by a predetermined length, so as to form an end surface.

11. A method of making an optical connector according to claim 10, wherein said first portion is ground together with the end surface of said optical fiber in a final stage of said grinding step.

12. A method of making an optical connector according to claim 10, further comprises a step of buffing the end surface of said optical fiber.

* * * * *